United States Patent
Niitsuma

(10) Patent No.: US 9,188,927 B2
(45) Date of Patent: Nov. 17, 2015

(54) INFORMATION PROCESSING APPARATUS FOR CONTROLLING ELECTRIC POWER CONSUMPTION, INFORMATION PROCESSING METHOD, AND STORAGE MEDIUM STORING CONTROL PROGRAM THEREFOR

(75) Inventor: Hiroaki Niitsuma, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 505 days.

(21) Appl. No.: 13/302,564

(22) Filed: Nov. 22, 2011

(65) Prior Publication Data

US 2012/0133969 A1    May 31, 2012

(30) Foreign Application Priority Data

Nov. 29, 2010  (JP) ................................. 2010-264960

(51) Int. Cl.
*G03G 15/00*        (2006.01)
*G06K 15/00*        (2006.01)

(52) U.S. Cl.
CPC ............ *G03G 15/55* (2013.01); *G03G 15/5004* (2013.01); *G06K 15/406* (2013.01)

(58) Field of Classification Search
None
See application file for complete search history.

(56) References Cited

U.S. PATENT DOCUMENTS

2010/0070216 A1*  3/2010  Murata ........................... 702/61
2010/0134834 A1*  6/2010  Nishikawa .................... 358/1.15
2011/0116128 A1*  5/2011  Tamada ....................... 358/1.15

FOREIGN PATENT DOCUMENTS

| JP | 2003108353 | * | 4/2003 |
| JP | 2003232819 | A | 8/2003 |
| JP | 2003-309684 | A | 10/2003 |
| JP | 2003309684 | * | 10/2003 |
| JP | 2003335026 | A | 11/2003 |
| WO | 03/069889 | A1 | 8/2003 |

OTHER PUBLICATIONS

Chinese Office Action issued in counterpart 201110382197.6 dated Feb. 8, 2014.
Office Action issued in counterpart Japanese Patent Application No. 2010-264960, dated Jul. 15, 2014.

* cited by examiner

*Primary Examiner* — Fan Zhang
(74) *Attorney, Agent, or Firm* — Rossi, Kimms & McDowell, LLP

(57) ABSTRACT

An information processing apparatus that is capable of controlling electric energy consumption with sufficient accuracy. An execution unit executes a job. A calculation unit calculates electric energy consumption in a period from a start of execution of the job by the execution unit to an end except a period from interruption of execution of the job by the execution unit to restarting, as electric energy consumption at the time of job execution.

8 Claims, 17 Drawing Sheets

*FIG. 2*

| JOB HISTORY ID | USER NAME | JOB TYPE | START TIME | FINISH TIME | NUMBER OF COLOR PAGES | NUMBER OF MONOCHROME PAGES | NUMBER OF SCANNED PAGES | ELECTRIC ENERGY CONSUMPTION OF JOB | ELECTRIC ENERGY CONSUMPTION BETWEEN JOBS |
|---|---|---|---|---|---|---|---|---|---|
| 1000 | user1 | COPY | 2010/6/2 18:33 | 2010/6/2 18:50 | 10 | 0 | 10 | 1000Wh | 10Wh |
| 1001 | user2 | SCAN | 2010/6/3 9:15 | 2010/6/3 9:15 | 0 | 0 | 3 | 150Wh | 100Wh |
| 1002 | user3 | PRINT | 2010/6/3 10:20 | 2010/6/3 10:28 | 10 | 5 | 0 | 1500Wh | 50Wh |

INFORMATION PROCESSING APPARATUS FOR CONTROLLING ELECTRIC POWER CONSUMPTION, INFORMATION PROCESSING METHOD, AND STORAGE MEDIUM STORING CONTROL PROGRAM THEREFOR

BACKGROUND OF THE INVENTION

1. Field of the Invention

The present invention relates to an information processing apparatus, an information processing method, and a storage medium storing a control program therefor, which control electric energy consumption in an electronic apparatus.

2. Description of the Related Art

In order to reduce electric energy consumption in electronic apparatuses, such as a printer, a multifunctional peripheral device, etc., it is required for enabling a user to recognize the electric energy consumption of an electronic apparatus (what is called "visualization"). In order to urge a user to act to reduce electric energy consumption, it is necessary to monitor and to control the electric energy consumption accurately for each process (a print, a copy, etc. for example) executed by each user and to enable the "visualization".

There is a known technique that image forming apparatuses, which can measure electric energy consumption, transmit data about electric energy consumption measured in response to requests by a control apparatus in a system where the image forming apparatus and the control apparatus are connected via a network (for example, see Japanese Laid-Open Patent Publication (Kokai) No. 2003-335026 (JP 2003-335026A)).

However, since the electric energy consumption measurement method disclosed in JP 2003-335026A does not assume an exceptional process, measurement of the electric energy consumption of the apparatus may be mistaken and lower control accuracy for electric energy consumption when a job is interrupted during execution of the job, for example.

Thus, the conventional technique has a problem that electric energy consumption of an electronic apparatus device cannot be controlled with sufficient accuracy.

SUMMARY OF THE INVENTION

The present invention provides an information processing apparatus, an information processing method, and a storage medium storing a control program therefor, which are capable of controlling electric energy consumption with sufficient accuracy.

Accordingly, a first aspect of the present invention provides an information processing apparatus comprising an execution unit configured to execute a job, and a calculation unit configured to calculate electric energy consumption in a period from a start of execution of the job by the execution unit to an end except a period from interruption of execution of the job by the execution unit to restarting, as electric energy consumption at the time of job execution.

Accordingly, a second aspect of the present invention provides an information processing method comprising executing a job, and calculating electric energy consumption in a period from a start of execution of the job in the executing to an end except a period from interruption of execution of the job in the executing to restarting, as electric energy consumption at the time of job execution.

Accordingly, a third aspect of the present invention provides a non-transitory computer-readable storage medium storing a control program causing a computer to execute an information processing method comprising executing a job, and calculating electric energy consumption in a period from a start of execution of the job in the executing to an end except a period from interruption of execution of the job in the executing to restarting, as electric energy consumption at the time of job execution.

According to the present invention, the electric energy consumption can be controlled with sufficient accuracy.

Further features of the present invention will become apparent from the following description of exemplary embodiments with reference to the attached drawings.

BRIEF DESCRIPTION OF THE DRAWINGS

FIG. 2 is a view showing an example of a job history information table held by a job history control unit.

DESCRIPTION OF THE EMBODIMENTS

Hereafter, embodiments according to the present invention will be described in detail with reference to the drawings.

Figure 1:
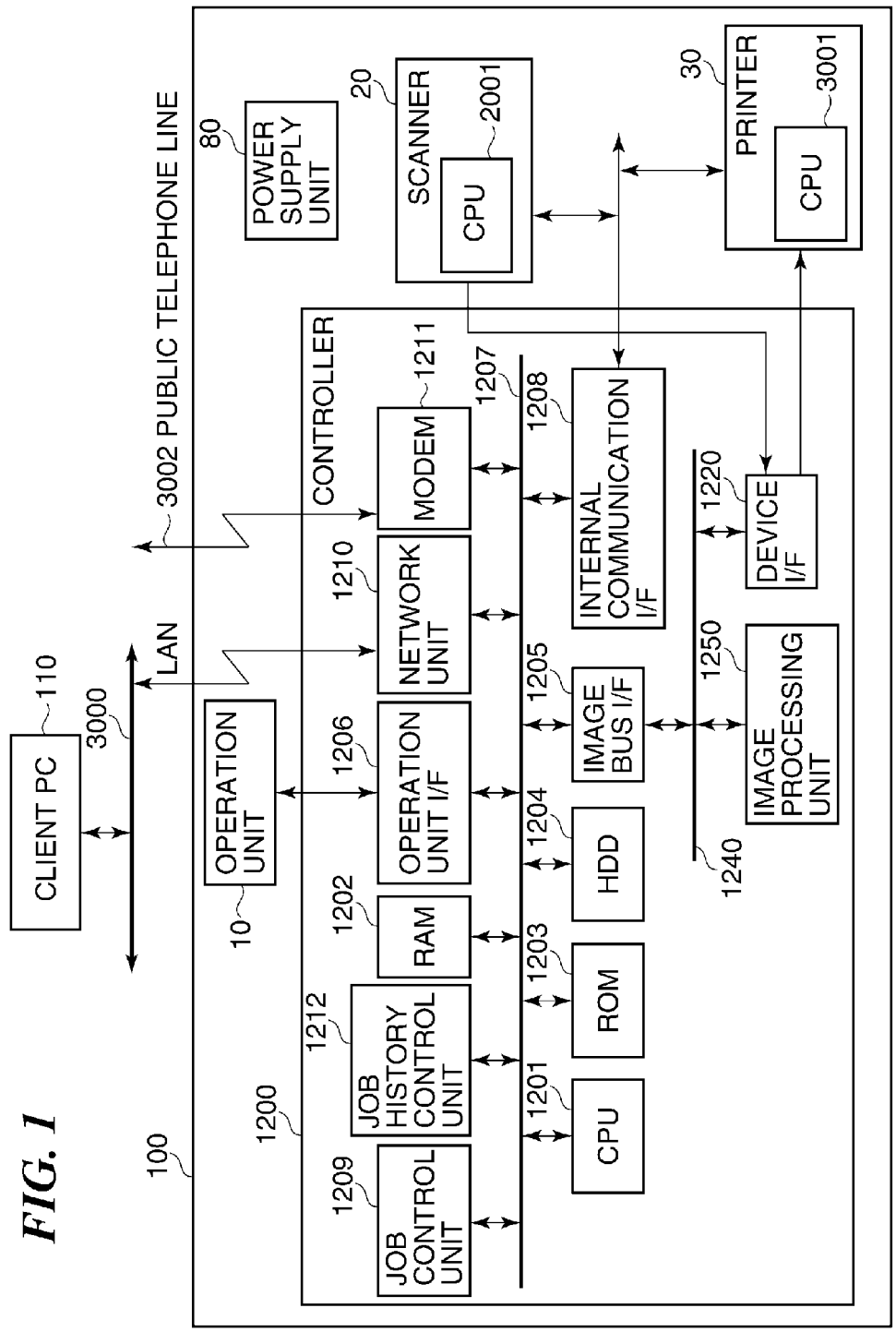
FIG. 1 is a block diagram schematically showing a configuration of an image forming apparatus according to a first embodiment of the present invention.

FIG. 1 is a block diagram schematically showing a configuration of an image forming apparatus according to a first embodiment of the present invention.

As shown in FIG. 1, the image forming apparatus 100 comprises an operation unit 10, a controller 1200, a power supply unit 80, a scanner 20, and a printer 30. The image forming apparatus 100 is connected with a client PC 110 via a LAN 3000. The client PC 110 is a computer that gives instructions of image formation, etc. to the image forming apparatus 100. In the first embodiment, the image forming apparatus is a target electronic apparatus of which electric energy consumption is controlled.

The operation unit 10 of the image forming apparatus 100 receives various kinds of operations by a user who uses the image forming apparatus 100. The power supply unit 80 supplies electric power to the scanner 20, the printer 30, the controller 1200, and the operation unit 10. The controller 1200 is connected with the scanner 20, the printer 30, the LAN 3000, and a public telephone line (WAN) 3001, and totally controls operations of the image forming apparatus 100. The controller 1200 controls input and output of image information, device information, information about the consumed electric energy, etc. The scanner 20 has a CPU 2001 that controls the scanner 20, and a lighting lamp, a scanning mirror, etc (not shown) for reading an original. The printer 30 prints image data onto a sheet.

The controller 1200 is provided with a job control unit 1209, a job history control unit 1212, a RAM 1202, an operation unit interface (I/F) 1206, a network unit 1210, a modem 1211, a CPU 1201, a ROM 1203, an HDD 1204, an image bus interface (I/F) 1205, an internal communication interface (I/F) 1208, a device interface (I/F) 1220, and an image processing unit 1250. These are connected to the system bath 1207, respectively.

The CPU 1201 functions as a control unit that controls over the image forming apparatus 100. The RAM 1202 is a system work memory for an operation of the CPU 1201, and is also an image memory for storing image data temporarily. The operation unit interface 1206 is an interface with the operation unit 10, and outputs the image data displayed on the operation unit 10 to the operation unit 10. The operation unit interface 1206 transfers the information that a user who uses the image forming apparatus 102 has inputted from the operation unit 10 to the CPU 1201.

The network unit 1210 is connected to the LAN 3000 in order to communicate (transmit and receive) with the client PC 100 and other computer terminals (not shown) on the LAN 3000. The modem 1211 is connected to the public telephone line 3002, and transmits and receives data with external facsimile machines (not shown). The ROM 1203 stores a boot program executed by the CPU 1201. The HDD 1204 stores system software, image data, software counter values, etc. The internal communication interface 1208 relays communication between the controller 1200, and the scanner 20 and the printer 30. The image bus interface 1205 is a bus bridge that connects the system bus 1207 and an image bus 1240, and converts a data structure.

The image processing unit 1250 performs image processes such as an RIP process, a scanner image process, a printer image process, an image rotation process, and an image compression process. The device interface 1220 connects the controller 1200 with the scanner 20 and the printer 30, and converts the image data between a synchronizing system and an asynchronous system. The image processing unit 1250 and the device interface 1220 are connected to the image bus 1240 that transfers image data at high speed.

The job control unit 1209 analyzes a print job, a copy job or the like, acquires output attribute information (a user name, print copies, color print, etc.), power consumption, etc., and controls them as job information. The job control unit 1209 generates a job identifier mentioned later, and controls the job identifier in association with the job information. The job control unit 1209 acquires job information about a job (a copy job, for example) that was issued by the operation unit 10 via the operation unit interface 1206, and acquires job information about a job (a print job, for example) that was issued by the client PC 110 or another terminal via the network unit 1210.

The job history control unit 1212 controls job history information (history information). The job history control unit 1212 registers the job information transmitted from the job control unit 1209 at the time of the end of the job with a job history information table, and holds it.

FIG. 2 is a view showing an example of the job history information table held by the job history control unit 1212.

As shown in FIG. 2, each record of the job history information table has a job history ID field 601, a user name field 602, a job type field 603, a start time field 604, a finish time field 605, a field of the number of color pages 606, a field of the number of monochrome pages 607, a field of the number of scanned pages 608, a field of electric energy consumption of a job 609, and a field of electric energy consumption between jobs 610.

An ID for identifying a job history uniquely is recorded in the job history ID field 601. A name of a user who instructs a job is recorded in the user name field 602. A type of an executed job is recorded in the job type field 603. The job type includes a copy job, a scan job, and a print job from the clients PC 110. A start time and a finish time of a job are recorded in the start time field 604 and the finish time field 605, respectively. The number of pages printed or copied in color by the job concerned is recorded in the field of the number of color pages 606. The number of pages printed or copied in monochrome by the job concerned is recorded in the field of the number of monochrome pages field 607. The number of pages scanned by the scanner 20 is recorded in the field of the number of scanned pages 608. The number of scanned pages in color and the number of scanned pages in monochrome may be recorded separately.

Electric energy consumed by the applicable job is recorded in the electric energy consumption field 609. Electric energy consumption consumed between the previous job and the applicable job is recorded in the field of the electric energy consumption between jobs 610. This shows the total amount of the electric energy consumption in exceptional operating states such as a standby state, a sleep state, and a job interrupted state of the image forming apparatus. It should be noted that sleep state shows a condition under which power supply required to achieve a predetermined function is stopped. The standby state shows a condition under which a predetermined process waits to execute, i.e., a condition under which a job will start immediately when receiving the job. The job interrupted state shows a condition under which a predetermined process has interrupted, i.e., a condition under which an active job is interrupted. Thus, since the embodiment supports the exceptional process, too, the electric energy consumption can be controlled with more sufficient accuracy. Specifically, the active job is interrupted when sheet-out or paper jam occurs, for example. The exceptional process is not limited to the interruption of a job and is suitably defined corresponding to an electronic apparatus.

As shown in FIG. 2, the job history information that defines who started and finished what type of a job at which time and how much electric energy (Wh) was consumed is recorded. For example, the job history 611 shows that the copy job was executed between 18:33:10 and 18:50:15, on 2010/6/2. The job history 611 also shows that 10 pages were scanned, 10 pages were printed in color, and the electric energy of 1000 Wh was consumed.

The job history information table may be created for each job type. There is no need to provide the job control unit 1209 and the job history control unit 1212 separately. The function of these units can be achieved also in the combination of software executed by the CPU 1201 and the storage unit like the HDD1204.

Figure 3:
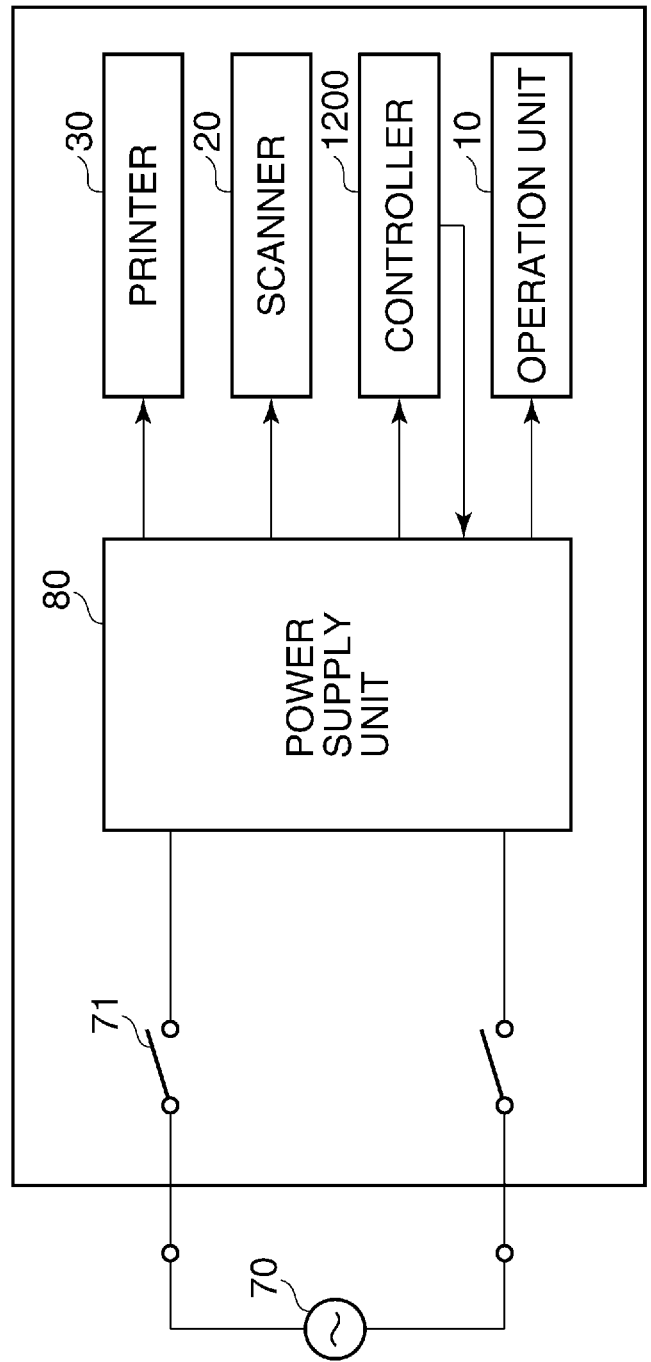
FIG. 3 is a block diagram schematically showing a configuration example of a power supply unit in FIG. 1.

FIG. 3 is a block diagram schematically showing a configuration example of the power supply unit 80 in FIG. 1.

As shown in FIG. 3, a commercial power source 70 is connected to the power supply unit 80 via a master electrical switch 71. The power supply unit 80 internally generates power sources needed for the units of the image forming apparatus 100, such as the scanner 20, the printer 30, the controller 1200, and the operation unit 10, and supplies.

Figure 4:
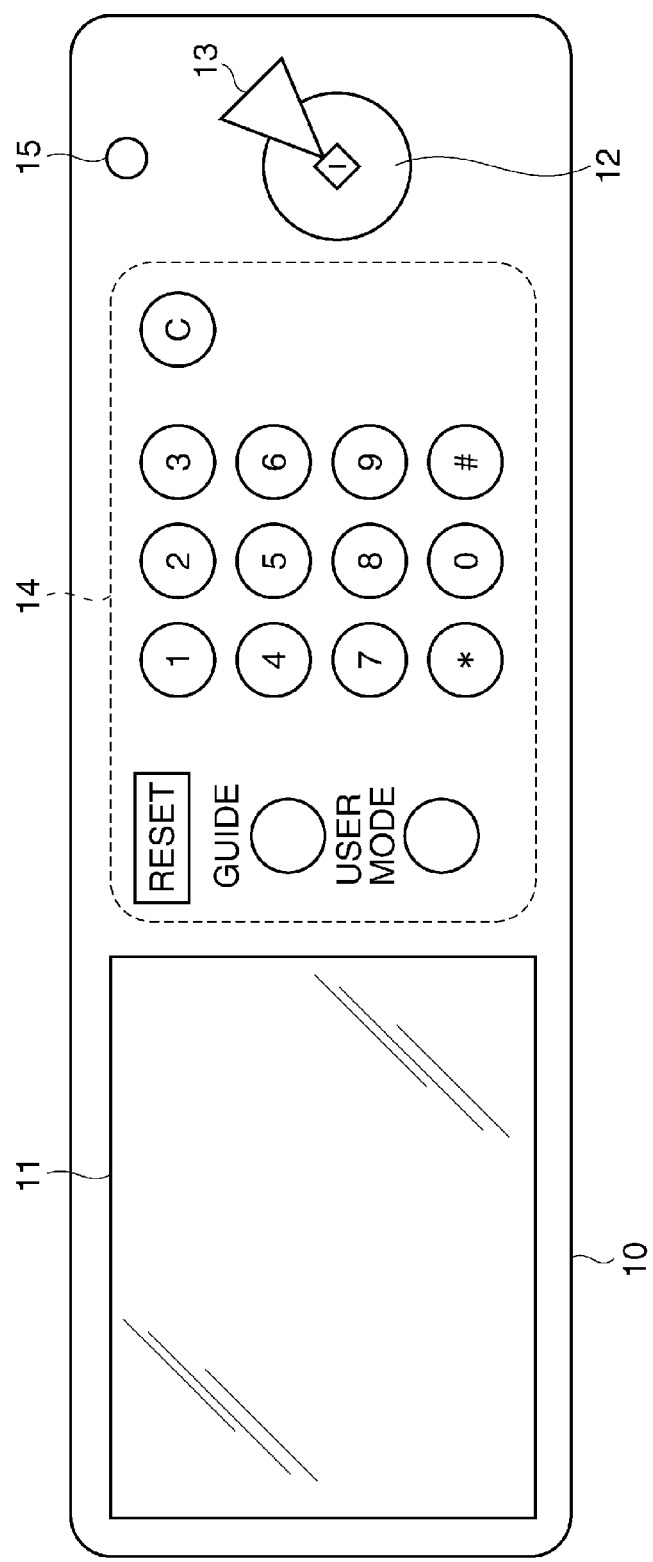
FIG. 4 is a plan view showing a configuration example of an operation unit in FIG. 1.

FIG. 4 is a plan view showing a configuration example of the operation unit 10 in FIG. 1.

A liquid crystal operation panel 11 is a combination of a liquid crystal display and a touch panel, displays an operation screen, and transmits information about an operation by a user on the operation screen to the controller 1200. The start key 12 is used for starting to read an original image and to print, and a start instruction of another function. The start key 62 is equipped with a green LED and a red LED. Lighting of the green LED in the start key 62 shows that an operation can start. Lighting of the red LED shows that an operation cannot start. The stop key 13 has a function for stopping an operation in action.

The hardkey group 14 includes a ten-key pad, a clear key, a reset key, a guide key, and a user mode key. The power-saving key 15 is used to shift the image forming apparatus 100 from a normal state to a sleep state or to return it from the sleep state to the normal state. In the image forming apparatus 100, the state is shifted to the sleep state when a user pushes the power-saving key 15 in the normal state. On the other hand, the state is shifted to the normal state when the user pushes the power-saving key 15 in the sleep state. The operation unit 10 transmits the information required for creating job information (the user name, the number of prints/copies, the output attribute information, which are inputted using the liquid crystal operation panel 11) to the operation unit interface 1206.

Figure 5:
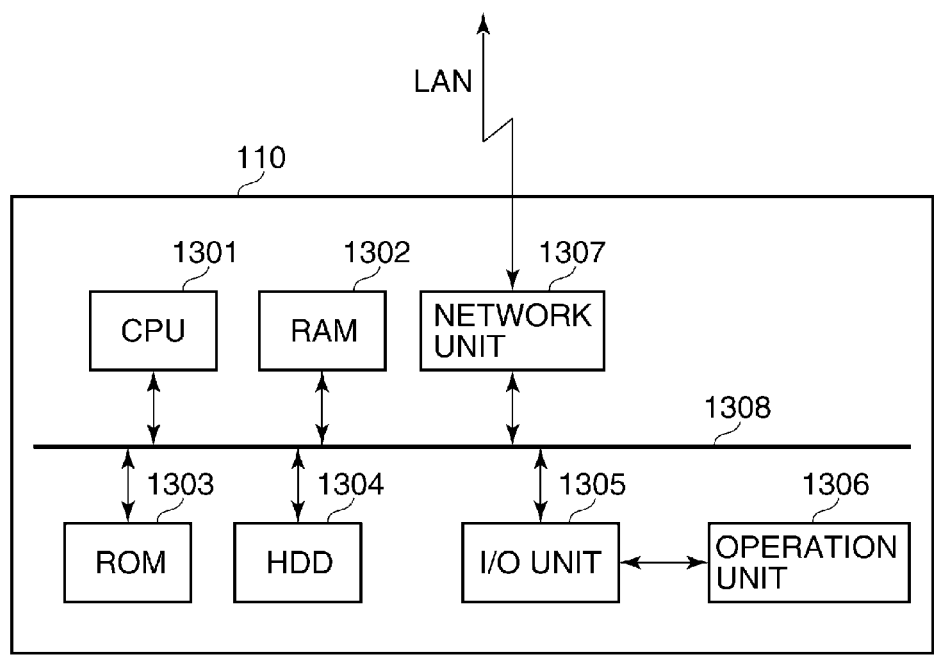
FIG. 5 is a block diagram schematically showing a configuration of a client PC shown in FIG. 1.

FIG. 5 is a block diagram schematically showing a configuration of the client PC 110 shown in FIG. 1.

As shown in FIG. 5, the client PC 110 comprises a CPU 1301, a RAM 1302, a network unit 1307, a ROM 1303, an HDD 1304, an IO unit 1305, and an operation unit 1306, which are respectively connected to a system bus 1308.

The CPU 1301 provides various functions by reading programs (an OS (Operating System), application software, etc.) from the HDD 1304 and by executing them. The RAM 1302 acts as a system work memory when the CPU 1301 executes the programs. The ROM 1303 stores a BIOS (Basic Input Output System), a program for starting the OS, and a configuration file. The HDD 1304 is a hard disk drive that stores system software etc. The network unit 1307 is connected to the LAN 3000 and communicates (transmits and receives) with external apparatuses, such as the image forming apparatus 100. The I/O unit 1305 is an interface that exchanges information with the operation unit 1306 that consists of input/output devices (not shown) such as the liquid crystal display and a mouse. The liquid crystal display renders predetermined information based on screen information that a program instructs with predetermined resolution and a color number. For example, a GUI (Graphical User Interface) screen is formed to display various windows, data, etc. that are required for the operation.

Next, the sleep state that is included in a power saving mode in the image forming apparatus 100 will be described. The image forming apparatus 100 can operate in the sleep state or in the normal state that is different from the sleep state. In the normal state, as shown in FIG. 3, the power supply unit 80 supplies electric power to the scanner 20, the printer 30, the operation unit 10, and the controller 1200, respectively. In the sleep state, the power supply unit 80 receives a command from the controller 1200, and does not supply electric power to the scanner 20, the printer 30, and the operation unit 10, but supplies electric power only to the controller 1200.

Since the power supply to main circuit elements including the CPU 1201 of the controller 1200 is stopped at the time, the electric energy consumption of the image forming apparatus 100 can be reduced significantly. When the network unit 1210 receives data like a print job from the client PC 110 on the LAN 3000, the network unit 1210 controls the power supply unit 80 so as to return to the normal state. It should be noted that the power supply to the CPU 1201 may not be intercepted in the sleep state. For example, the power supply to the CPU 1201 in the sleep state may be reduced as compared with that in the normal state. In this case, the processes that the CPU 1201 can execute in the sleep state are restricted as compared with that in the normal state. A process of data that the network unit 1210 received from a computer terminal on the LAN 3000 is restricted at least.

Since electric power is supplied to the RAM 1202 from the power supply unit 80 in the sleep state, the RAM 1202 performs a self refresh operation to back up the system program.

The return to the normal state from the sleep state of the image forming apparatus 100 in FIG. 1 will be described in detail below.

When receiving a print job from the client PC 110, for example, the network unit 1210 analyzes the job to determine whether a data sequence corresponding to an inherent physical address of the home apparatus (the image forming apparatus 100) is included in packets received as the print job. The network unit 1210 starts the CPU 1201, when the data sequence corresponding to the home apparatus is detected.

At this time, the CPU 1201 determines whether the CPU 1201 started as a result of the return to a normal state from the sleep state. When the CPU 1201 determines that the CPU 1201 started as a result of the return to the normal state from the sleep state, a starting sequence starts. At this time, the CPU 1201 omits a sequence that downloads a system program from the HDD 1204 to the RAM 1202, and uses the system program that was backed up to the RAM 1202 at the time of shifting to the sleep state. Accordingly, the controller 1200, which returned to the normal state, controls the printer 30 to start printing out in response to the print job from the client PC on the LAN 3000.

Although the network unit 1210 executes the process that changes the power supply mode from the sleep state to the normal state in the above-mentioned description, another configuration can be employed. Specifically, not only the network unit 1210 but also the modem 1211 or the operation unit interface 1206 can change the state to the normal state from the sleep state. The former case enables facsimile communication using the public telephone line, and the latter case enables to receive instructions from a user who uses the operation unit interface 1206. At this time, only the power-saving key 15 of the operation unit 10 is activated even in the sleep state so as to communicate with the operation unit interface 1206, which enables to shift the state from the sleep state to the normal state. In this embodiment, the normal state includes a standby state and a job interrupted state.

Figure 6:
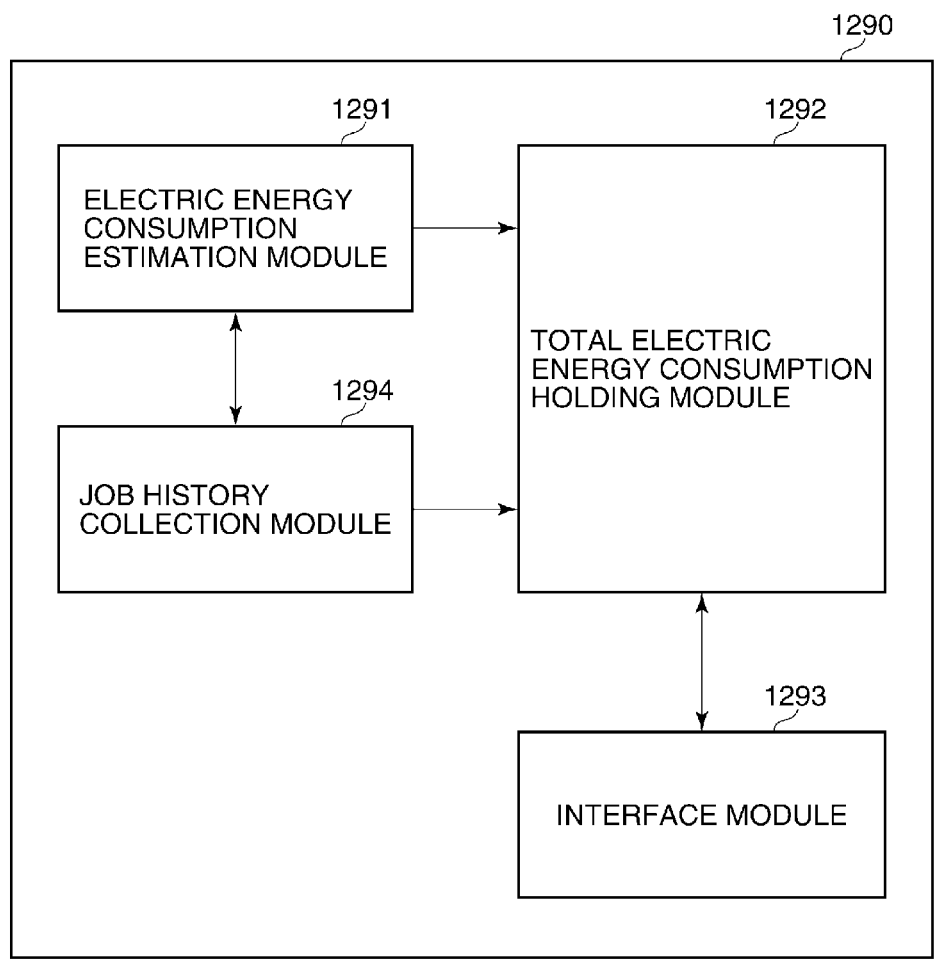
FIG. 6 is a block diagram showing a module configuration of an electric energy consumption control program executed by the image forming apparatus in FIG. 1.

FIG. 6 is a view showing a module configuration of an electric energy consumption control program 1290 executed by the image forming apparatus 100 in FIG. 1.

The electric energy consumption control program 1290 shown in FIG. 6 is stored in the HDD 1204 together with the job control program etc. that execute a print job, a copy job, etc. These programs are read to the RAM 1202 from the HDD 1204, when the CPU 1201 executes the boot program. The processes are achieved because the CPU 101 executes the programs read to the RAM 1202.

In the electric energy consumption control program 1290 in FIG. 6, a job history collection module 1294 acquires and holds the job history information table managed by the job history control unit 1212. That is, the job history collection module 1294 acquires the history information that shows the history of the operating states of the image forming apparatus 100. An electric energy consumption estimation module 1291 estimates and calculates electric energy consumption for each operating state of the image forming apparatus 100. The electric energy consumption estimation module 1291 has found the power consumption of the image forming apparatus 100 per unit time in the standby state, that in the sleep state, and that for each job type beforehand by measurement in experiments, calculation of theoretical values, etc., and holds them as parameters. That is, the power consumption in each operating state is recorded beforehand.

The electric energy consumption estimation module 1291 calculates estimated electric energy consumption based on operating time for each operating state of the image forming apparatus 100 by referring to the power consumption per unit time for each operating state that has been found beforehand. That is, the electric energy consumption estimation module 1291 calculates the electric energy consumption in the operating status shown in the history information using the history information acquired by the job history collection module 1294 and the power consumption that is determined according to the operating status of the image forming apparatus 100.

Then, a total electric energy consumption holding module 1292 calculates and holds the electric energy consumption of job and the electric energy consumption between jobs based on the value of the estimated electric energy consumption calculated by the electric energy consumption estimation module 1291 and the history information of the job history information table held by the job history collection module 1294. The electric energy consumption held by the total electric energy consumption holding module 1292 is used in order to manage the electric energy consumption for each operating state of the image forming apparatus 100 mentioned later.

An interface module 1293 displays the total electric power consumption held by the total electric energy consumption holding module 1292 on the liquid crystal operation panel 11 of the operation unit 10. The interface module 1293 outputs the total electric power consumption to the client PC 110 and another external apparatus connected to the LAN 3000 via the network unit 1210.

Next, an execution of a print job by the image forming apparatus according to the embodiment will be described. The image forming apparatus 100 in FIG. 1 executes a printing process as follows based on a print job transmitted from the client PC 110 connected to the LAN 3000.

When receiving the print job, the CPU 1201 notifies the printer 30 of a job start via the internal communication interface 1208. The CPU 3001 of the printer 30 controls the printer 30 so as to enable to print according to the notification of the job start.

The CPU 1201 stores printing data, which is image data received from the client PC 110 connected to the LAN 3000 via the network unit 1210, to the RAM 1202.

Then, the image data is supplied to the image processing unit 1250 via the image bus interface 1205. The image processing unit 1250 develops the image data (PDL code) to bitmap data, performs a compression process, and stores it in the HDD 1204. Next, the image processing unit 1250 expands the image data (the compressed bitmap data) stored in the HDD 1204, applies processes of correction and of resolution change to the image data according to the characteristics of the printer 30, applies a rotation process to the image data if needed. Next, the image data to which the various processes have been applied is sent to the printer 30 via the device interface 1220 as printing data. The printer 30 prints the image data onto a sheet. The CPU 1201 notifies the printer 30 of a job end via the internal communication interface 1208. The CPU 3001 of the printer 30 controls the printer 30 so as to be in a print end state according to the notification of the job end.

Next, an execution of a scan job by the image forming apparatus according to the embodiment will be described. The image forming apparatus 100 executes a scanning process as follows based on instructions about a scan job from the operation unit 10.

When receiving the scan job, the CPU 1201 notifies the scanner 20 of a job start via the internal communication interface 1208. The CPU 2001 of the scanner 20 controls the scanner 20 so as to enable to read according to the notification of the job start. Then, the scanner 20 starts reading and the read image data is stored in the RAM 1202. Then, the image data is supplied to the image processing unit 1250, is compressed by the compression process, and is stored in the HDD 1204. Next, the image data (the compressed bitmap data) stored in the HDD 1204 is transmitted to the apparatus designated by the CPU 1201 as a destination via the network unit 1210. The destination is set by the user through the operation unit 10. The HDD 1204 of the image forming apparatus 100 is selectable as the destination. After completion of the transmission process, the CPU 1201 notifies the scanner 20 of a job end via the internal communication interface 1208. The CPU 2001 of the scanner 20 controls the scanner 20 so as to be in a print end state according to the notification of the job end.

Figure 7:
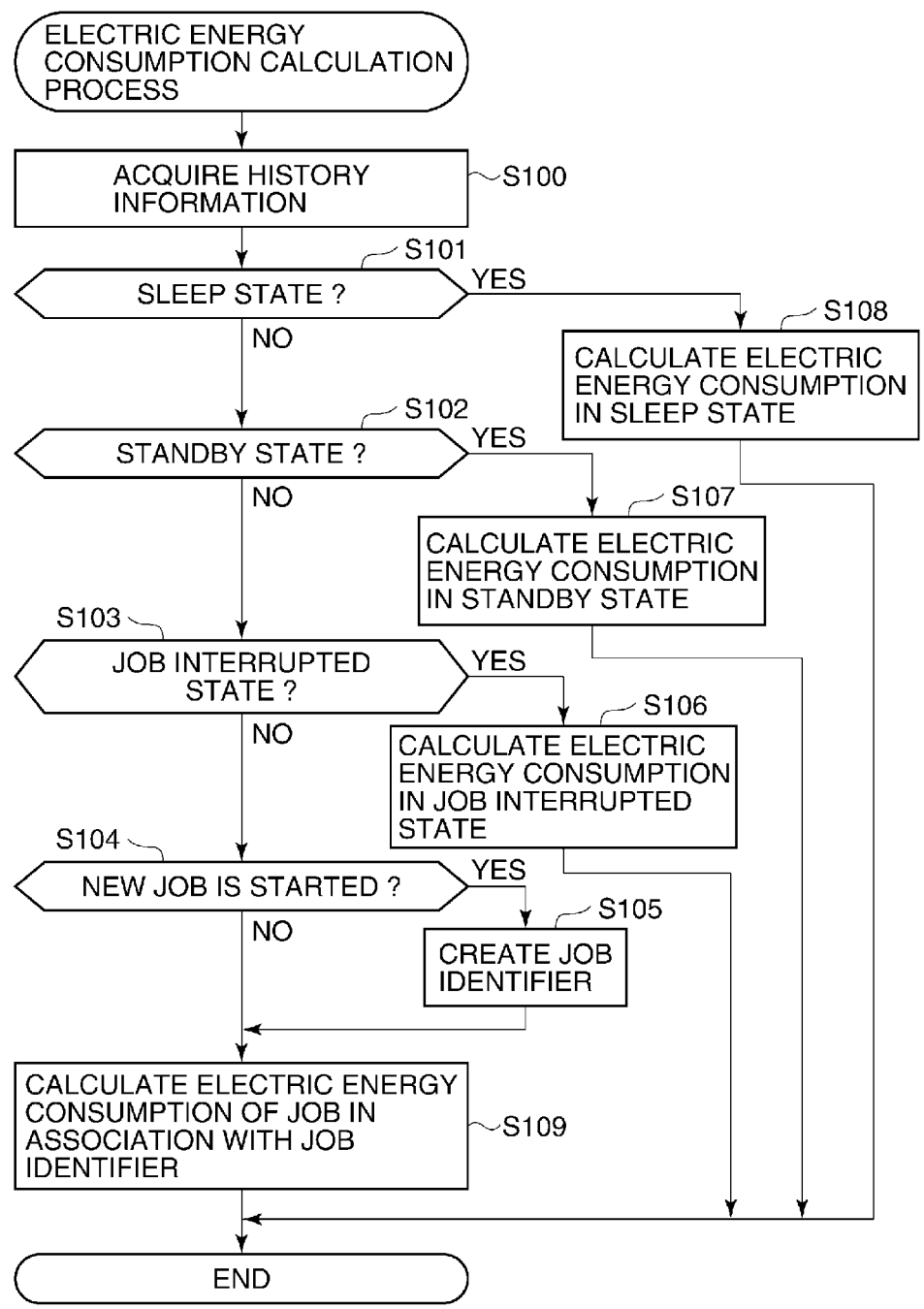
FIG. 7 is a flowchart showing a procedure of an electric power consumption calculation process executed by the image forming apparatus in FIG. 1.

FIG. 7 is a flowchart showing a procedure of an electric power consumption calculation process executed by the image forming apparatus 100 in FIG. 1.

The process in FIG. 7 is executed by the CPU 1201 in the image forming apparatus 100 in FIG. 1. This process is executed, when an operation state of the image forming apparatus 100 is changed, or when a job process starts and is interrupted, and the electric energy consumption for every state is calculated.

The CPU 1201 acquires the history information of the job history information table managed by the job history control unit 1212 (step S100), and calculates electric energy consumption corresponding to the operation state of the image forming apparatus 100 as follows.

First, the CPU 1201 determines whether the operation state of the image forming apparatus 100 is the sleep state. When it is determined that the operation state is the sleep state (YES in the step S101), the electric energy consumption estimation module 1291 calculates the electric energy consumption in the sleep state based on the duration between the shifting to the sleep state and the returning to the normal state (step S108), and this process finishes.

When it is determined that the operation state is not the sleep state (NO in the step S101), the CPU 1201 determines whether the operation state of the image forming apparatus 100 is the standby state. When it is determined that the operation state is the standby state (YES in the step S102), the electric energy consumption estimation module 1291 calculates the electric energy consumption in the standby state (step S107), and this process finishes.

When it is determined that the operation state is not the standby state (NO in the step S102), the CPU 1201 determines whether the image forming apparatus 100 temporarily interrupted the job during execution of the job. When it is determined that the image forming apparatus 100 is in the job interrupted state (YES in the step S103), the electric energy consumption estimation module 1291 calculates the electric energy consumption in the job interrupted state (step S106), and this process finishes. The job interrupted state is the condition under which the image forming apparatus 100 interrupts the current active job because toner-out, sheet-out, or paper jam occurs during execution of the print job. Since this embodiment distinguishes the electric energy consumption in the regular standby state and that in the job interrupted state, a user can obtain more detailed electric power control information.

When it is determined that the image forming apparatus 100 is not in the job interrupted state, the CPU 1201 determines whether a new job is started (step S104). Thus, when the image forming apparatus 100 starts a print job, a scan job, or the like, it is determined whether a new job starts or the interrupted job restarts.

When the new job starts (YES in the step S104), the job control unit 1209 creates a job identifier that can identify the job uniquely (step S105), and the process proceeds to step S109.

When the job is not a newly started job (NO in the step S104), the process skips the step S108 and proceeds to the step S109. In the step S109, the electric energy consumption estimation module 1291 calculates the electric energy consumption of the job that the image forming apparatus 100 executes in association with the job identifier that is created by the job control unit 1209, and this process finishes. At this time, the CPU 1201 holds the electric energy consumption calculated in the step S109 to the job history control unit 1212 as electric energy consumption that the image forming apparatus 100 consumed.

According to the process in FIG. 7, since the history information is acquired (step S100) and the electric energy consumption in the operation condition shown by the history information is calculated using the acquired history information and the power consumption that is determined by an operation state of the electronic apparatus (steps S106 through S109), the electric energy consumption can be calculated with sufficient accuracy. Since the history information records the exceptional operating states other than the job execution, such as the standby state, the sleep state, and the job interrupted state of the image forming apparatus, the electric energy consumption can be calculated with sufficient accuracy even when the exceptional process is executed.

Figure 8:
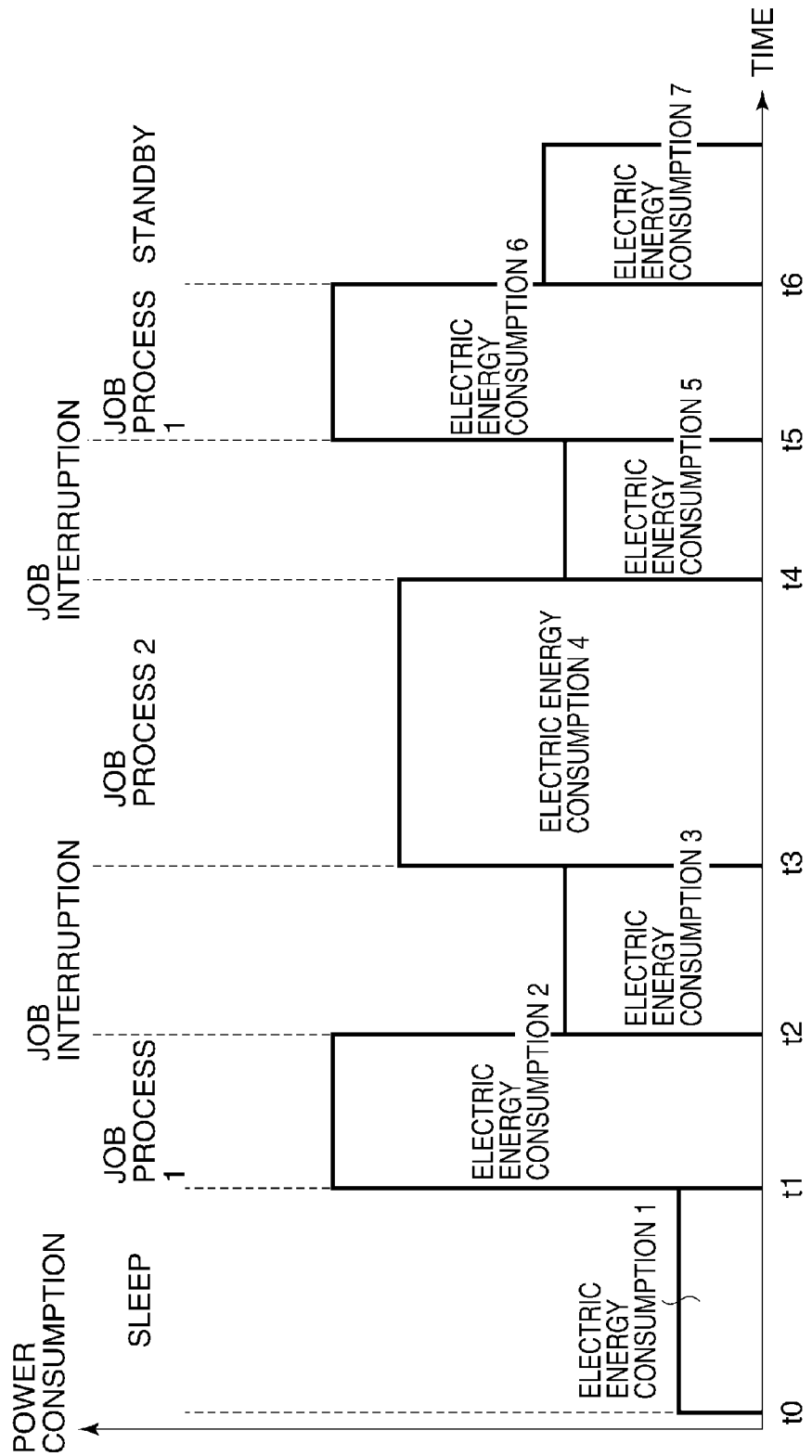
FIG. 8 is a graph showing an example of the electric energy consumption calculated by the process in FIG. 7.

FIG. 8 is a view showing an example of the electric energy consumption calculated by the process in FIG. 7.

In FIG. 8, the image forming apparatus 100 shifts to the sleep state at time t0, returns from the sleep state at time t1, and starts a job process 1. The job process 1 is a print job here, for example. The image forming apparatus 100 interrupts the job process 1 that is the print job owing to sheet-out, for example, at time t2. Therefore, the image forming apparatus 100 is in the job interrupted state from the time t2.

The image forming apparatus 100 starts a job process 2 that is a scan job at time t3. The image forming apparatus 100 in this embodiment enables a degeneration operation of a function. For example, even when the print job cannot be executed because of the sheet-out, the scan job can be executed regardless of the sheet-out. The job process 2 is normally completed at time t4, and the image forming apparatus 100 is in the job interrupted state of the job process 1 again.

The job process 1 that is the print job restarts at time t5 because sheet is supplied to the image forming apparatus 100. At time t6, the job process 1 is completed normally and the operation state is shifted to the standby state.

The process shown in FIG. 7 is executed when the operation state of the image forming apparatus 100 changes as mentioned above, and when a job process is started and interrupted. Accordingly, the electric energy consumption between the times t0 and t1 is held as the electric energy consumption in the sleep state. Since the job between the times t1 and t2 and the job between the times t5 and t6 are identified as the same job by the same job identifier, the electric energy consumption during the two terms is held as the electric energy consumption of the job process 1. The electric energy consumption between the times t2 and t3 and the times t4 and t5 is held as the electric energy consumption in the job interrupted state. The electric energy consumption between the times t3 and t4 is held as the electric energy consumption of the job process 2 that is distinguished from the job processing 1 by the job identifier that is different from that of the job process 1. The electric energy consumption after the time t6 at the time when the job processes are completed normally is held as the electric power consumption in the standby state.

Figure 9:
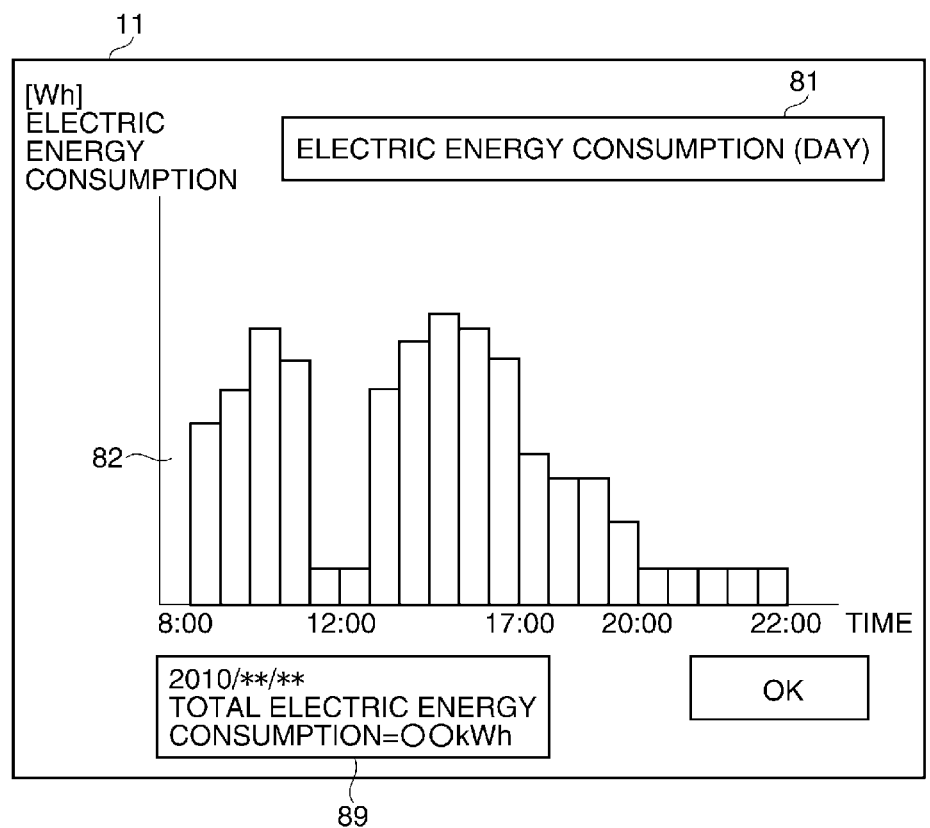
FIG. 9 is a view showing a screen example displaying the electric power consumption displayed on a liquid crystal operation panel in FIG. 4.

FIG. 9 is a view showing a screen example displaying the electric power consumption displayed on the liquid crystal operation panel in FIG. 4.

The screen example in FIG. 9 shows information about the electric energy consumption displayed on the liquid crystal operation panel 11, when a user operates the operation unit 10. A title 81 of the displayed information is "ELECTRIC ENERGY CONSUMPTION (DAY)" in this screen example because the information about the electric energy consumption for one day is shown as a graph.

Total electric energy consumption 89 shows the total electric energy consumption in the term currently displayed. In response to the instructions from a user, an electric energy consumption graph 82 is made by the electric energy consumption in a certain term and is displayed. In this case, a vertical axis denotes the electric energy consumption of each term, and a horizontal axis denotes time.

Figure 10:
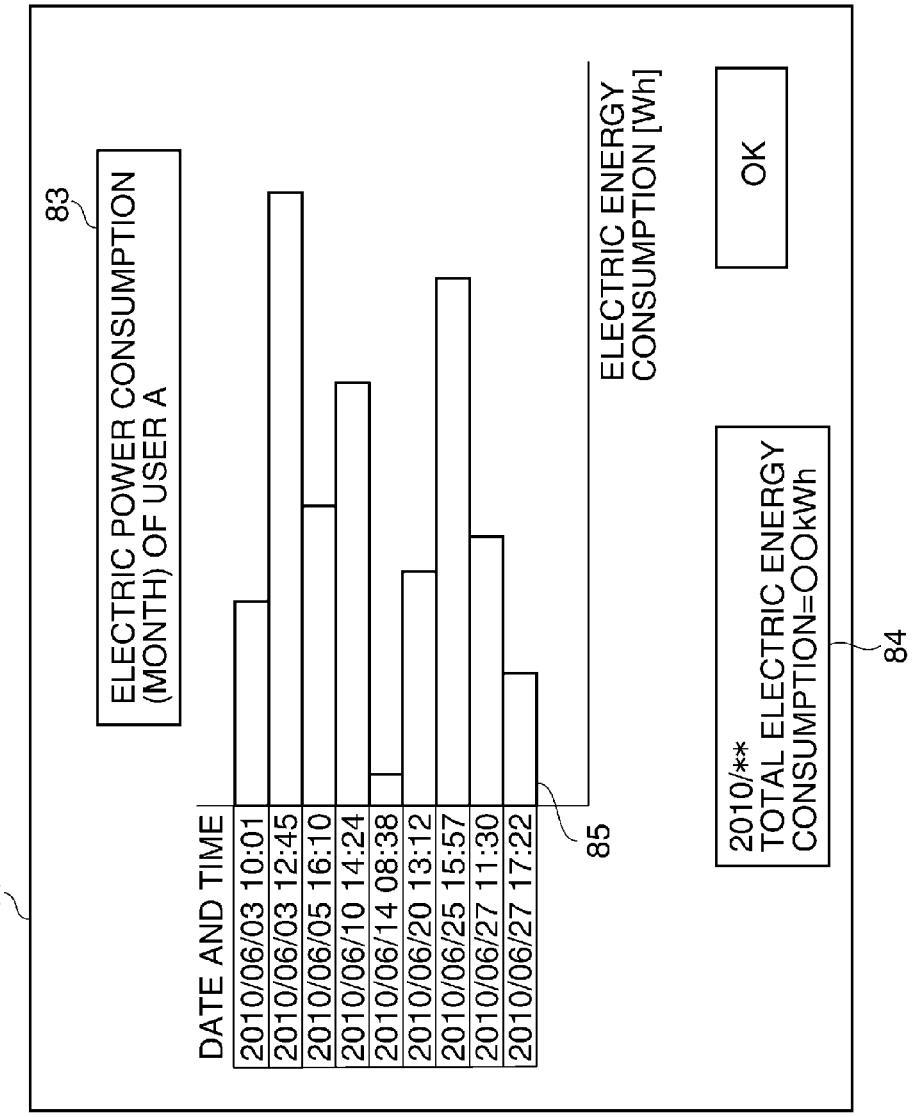
FIG. 10 is a view showing a screen example displaying the electric energy consumption for jobs executed by a user displayed on the liquid crystal operation panel in FIG. 4.

FIG. 10 is a view showing a screen example displaying the electric energy consumption for jobs executed by a user displayed on the liquid crystal operation panel 11 in FIG. 4.

In FIG. 10, a title 83 of the displayed information is "ELECTRIC ENERGY CONSUMPTION (MONTH) OF USER A" in this screen example because the information about the electric energy consumption of a user A for one month is shown as a graph. Total electric energy consumption 84 shows the total electric energy consumption in the term currently displayed. An electric energy consumption graph 85 shows the date and time and the electric energy consumption of each of jobs that are executed by the user A in the applicable month as the graph. In the case in FIG. 10, a horizontal axis denotes the electric energy consumption of each job.

Figure 11:
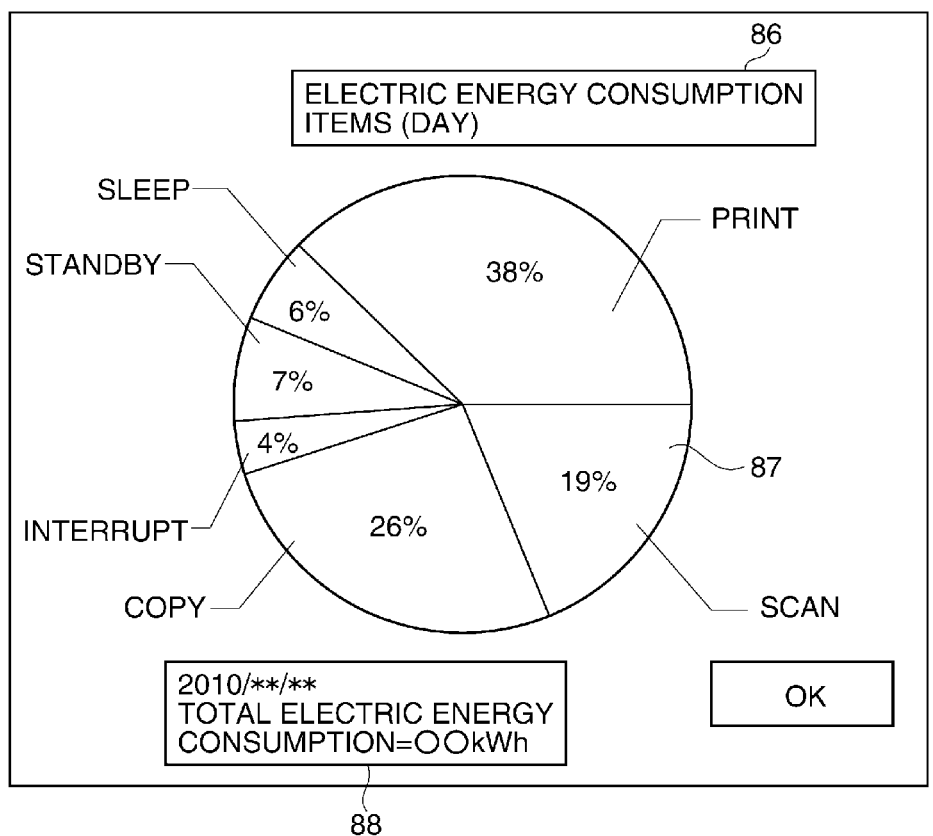
FIG. 11 is a view showing a screen example displaying electric energy consumption items displayed on the liquid crystal operation panel in FIG. 4.

FIG. 11 is a view showing a screen example displaying electric energy consumption items displayed on the liquid crystal operation panel 11 in FIG. 4.

In FIG. 11, a title 86 of the displayed information is "ELECTRIC ENERGY CONSUMPTION ITEMS (DAY)" in this screen example because the information about the electric energy consumption items of the image forming apparatus 100 in one day is displayed as a circle graph. Total electric energy consumption 88 shows the total electric energy consumption in the day currently displayed. In an electric-energy-consumption-items circle graph 87, the image forming apparatus 100 shows information about items of the electric energy consumption in the operation states and the electric energy consumption of the executed jobs in the applicable day as a circle graph. In this case, the items of the operation states are shown by percentages to the total electric energy consumption in the applicable day.

A display process for displaying these screen examples is executed when a display request from the operation unit 10 by a user is transmitted to the CPU 1201 via the operation unit interface 1206. Specifically, it is achieved when the CPU 1201 executes the interface module 1293 in the electric energy consumption control program 1290 mentioned above. Although the screen examples are displayed on the liquid crystal operation panel 11 of the operation unit 10 in this embodiment, they may be displayed on a display unit of an external apparatus like the client PC 110 on the LAN 3000 via the network unit 1210 in response to the request from the external apparatus.

Next, a second embodiment of the present invention will be described with reference to the drawings.

According to the second embodiment, a power measurement unit is provided in the image forming apparatus 100 to measure power consumption of the image forming apparatus and to control electric energy consumption. The first embodiment estimates the electric energy consumption using the predetermined parameters. On the other hand, since the second embodiment actually measures the electric energy consumption, the electric energy consumption can be controlled with higher accuracy as compared with the first embodiment. Since the configuration of the image forming apparatus in the second embodiment is similar to the configuration of the image forming apparatus 100 in a first embodiment, only difference will be described. In the second embodiment, the image forming apparatus is a target electronic apparatus of which electric energy consumption is controlled.

Figure 12:
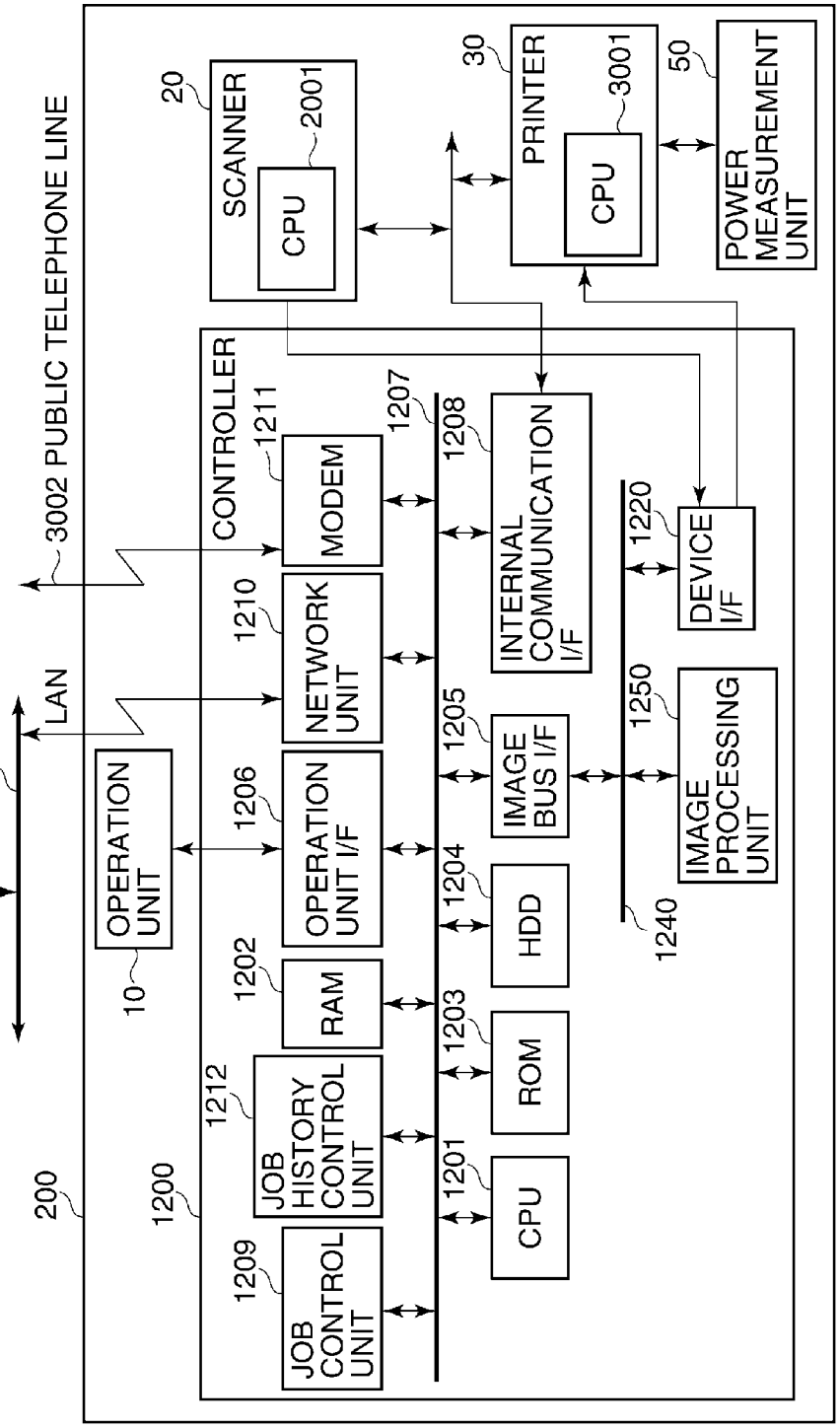
FIG. 12 is a block diagram schematically showing a configuration of an image forming apparatus according to a second embodiment of the present invention.

FIG. 12 is a view schematically showing the configuration of the image forming apparatus 200 according to the second embodiment of the present invention.

As shown in FIG. 12, the image forming apparatus 200 has a power measurement unit 50, which actually measures power consumption of the image forming apparatus 200, in addition to the configuration of the image forming apparatus 100.

Figure 13:
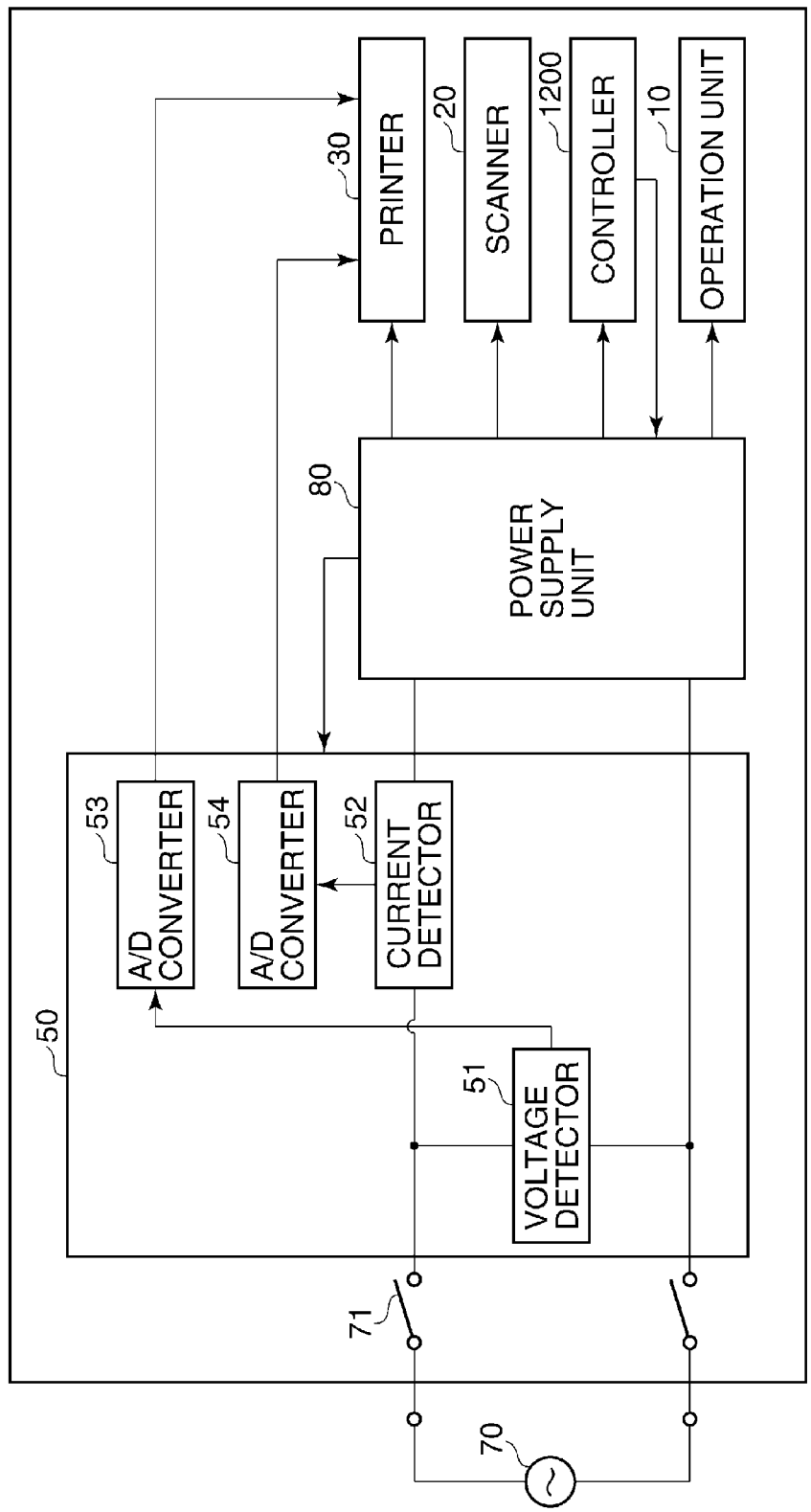
FIG. 13 is a block diagram schematically showing a configuration of a power measurement unit in FIG. 12.

FIG. 13 is a view schematically showing a configuration of the power measurement unit 50 in FIG. 12.

As shown in FIG. 13, the power measurement unit 50 has a voltage detector 51, a current detector 52, and A/D convertors 53 and 54.

The voltage detector 51 detects a voltage value and the current detector 52 detects an electric current value. The voltage detector 51 rectifies full waves of L (line) and N (neutral) of a general commercial power source 70, and lowers the rectified value by a transformer etc. The lowered value is read by the A/D convertor 53, and is converted into the digital data. The digital data is outputted as the voltage value. The current detector 52 detects magnetic field generated by the electric current passing through the L (line) as a voltage. The voltage is read by the A/D convertor 54, and is converted into the digital data. The digital data is outputted as the electric current value. Otherwise, the current detector 52 may read the electric current value by inserting an electric current detection resistance. The electric current value may be detected by inserting an element that changes temperature thereof in response to the flowing current. The voltage value and the electric current value, which are detected by the above mentioned methods and converted by the A/D converters, are inputted into the printer 30 in this embodiment. The voltage value and the electric current value inputted are read by the CPU 3001 inside the printer 30, and a result multiplied by the two values is held as power consumption. Electric energy consumption within predetermined time is calculated by multiplying the power consumption by the lapsed time from the last reading time, i.e., the time during which the operating state continued. The electric energy consumption calculated in the printer 30 based on the voltage value and the electric current value is transmitted to the CPU 1201 in the controller 1200 because the printer 30 communicates with the internal communication interface 1208 in the controller 1200. As another method, a DSP (digital signal processor), which carries out an operation of digital data at high speed, may be mounted in the power measurement unit 50, and the electric energy consumption may be calculated inside the power measurement unit 50. In this case, the power measurement unit 50 may directly connect with the controller 1200 via the internal communication interface 1208.

It should be noted that an electric energy consumption control program executed by the image forming apparatus 200 in the second embodiment is the same as the electric energy consumption control program 1290 in the first embodiment. However, in the second embodiment, the electric energy consumption of the image forming apparatus 200 is surveyed by the power measurement unit 50 instead of carrying out the estimated calculation of the electric energy consumption by the electric energy consumption estimation module 1291.

Figure 14:
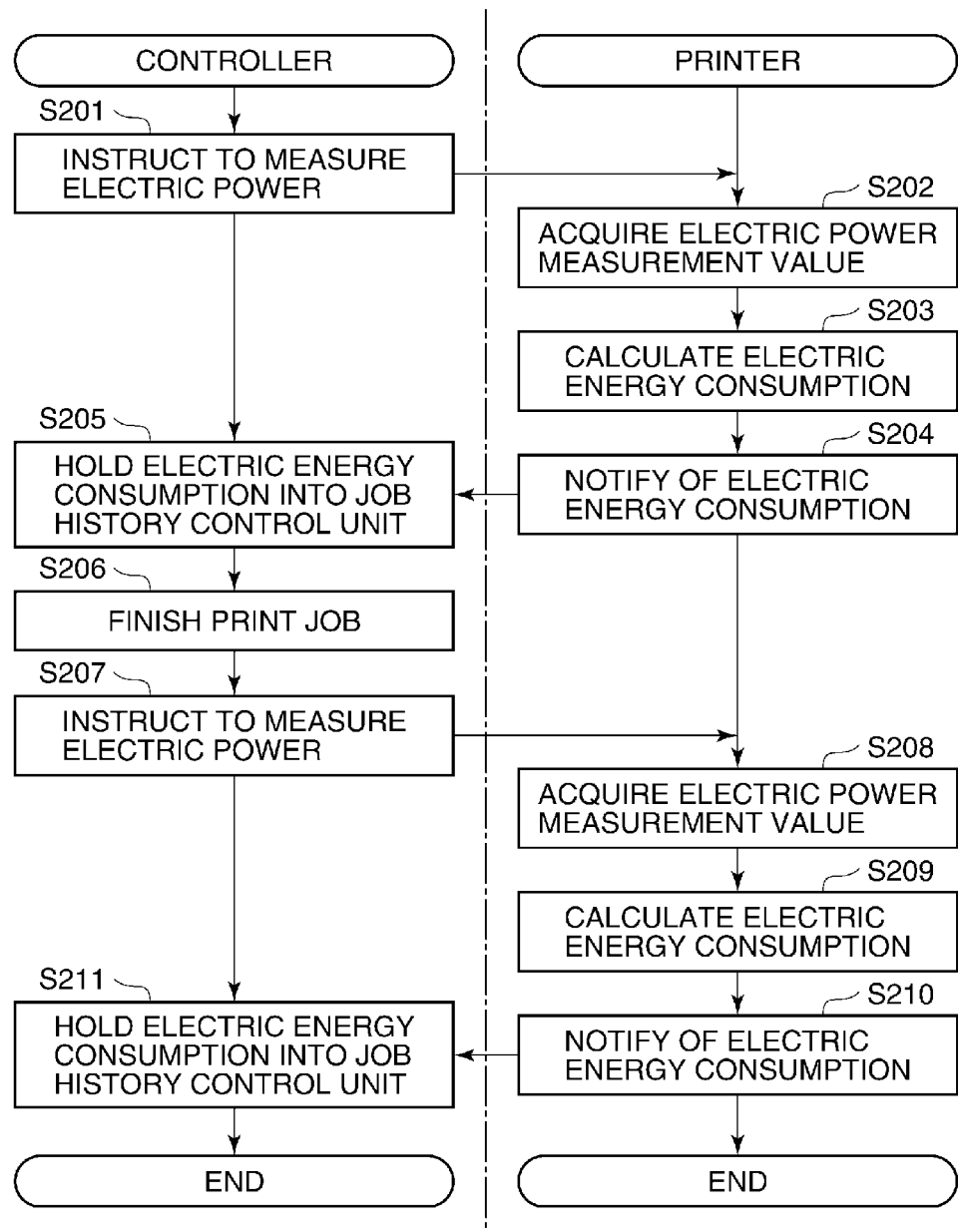
FIG. 14 is a flowchart showing procedures of an electric energy consumption calculation process control process executed by a controller and a printer.

FIG. 14 is a flowchart showing procedures of an electric energy consumption calculation process executed by the controller 1200 and the printer 30.

As shown in FIG. 14, when receiving the print job, the CPU 1201 notifies the printer 30 of a job start via the internal communication interface 1208 and instructs the printer 30 to measure the electric power at the same time (step S201).

When receiving the electric power measurement instruction, the printer 30 acquires the measurement value of the power measurement unit 50 (step S202). It should be noted that the acquisition of the measurement value by the printer 30 may be performed after predetermined time from the time of receiving the electric power measurement instruction. After acquiring the measurement value, the electric energy consumption is calculated by multiplying the elapsed time from the time of the last measurement of the electric power with the electric power (step S203). The CPU 3001 of the printer 30 notifies the CPU 1201 of the electric energy consumption (referred to as electric energy consumption 8) via the internal communication interface 1208 (step S204).

The CPU 1201 holds the electric energy consumption 8 into the job history control unit as the electric energy consumption in the standby state (step S205). After completion of the print job (step S206), the CPU 1201 notifies the printer 30 of a job end via the internal communication interface 1208 and instructs the printer 30 to measure the electric power at the same time (step S207).

When receiving the electric power measurement instruction, the printer 30 acquires the measurement value of the power measurement unit 50 (step S208). After acquiring a measurement value, the electric energy consumption is calculated by multiplying the elapsed time from the time of the last acquisition of the measurement value with the electric power (step S209). The CPU 3001 of the printer 30 notifies the CPU 1201 of the electric energy consumption (referred to as electric energy consumption 9) via the internal communication interface 1208 (step S210), and finishes the process by the printer 30.

The CPU 1201 holds the electric energy consumption 9 to the job history control unit as the electric energy consumption of the job process that is uniquely identified by the job identifier (step S211), and finishes the process by the controller 1200.

Figure 15:
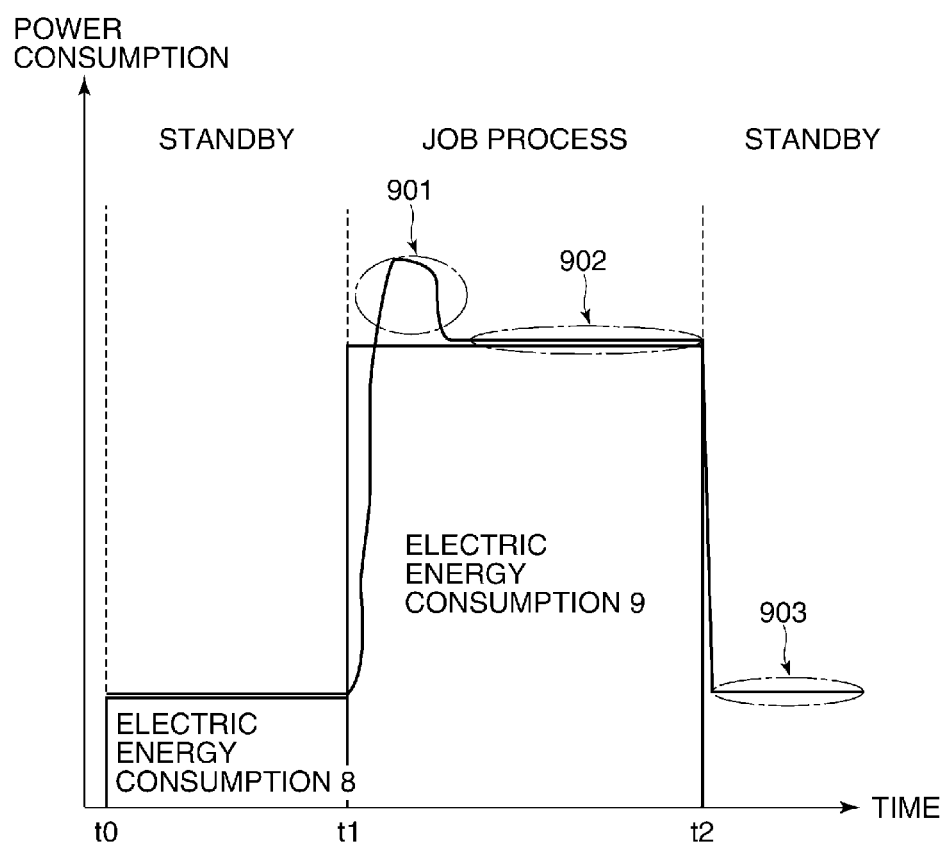
FIG. 15 is a graph showing relationship between the power consumption of the image forming apparatus and the lapsed time from the start to the end of a job.

FIG. 15 is a view schematically showing relationship between the power consumption of the image forming apparatus 200 and lapsed time from the start to the end of the job.

FIG. 15 shows the electric energy consumption 8 notified to the CPU 1201 in the step S204 in FIG. 14 and the electric energy consumption 9 notified to the CPU 1201 in the step S210.

Time t0 is the last time when the electric power was measured. Time t1 is the time of the step S202 in FIG. 14. Time t2 is the time of the step S208 in FIG. 14. The power consumption of the image forming apparatus 200 raises after starting the job in order to shift the image forming apparatus 200 to a print start state (to raise temperature of a fixing unit etc.) as shown in a section 901.

After the image forming apparatus 200 shifts to the print start state, the power consumption becomes constant as shown in a section 902. After the completion of the job, since the image forming apparatus 200 shifts to the standby state, the power consumption descends and becomes constant as shown in a section 903.

Since the power consumption of the image forming apparatus 200 varies as described above, the electric energy consumption 9 acquired in this embodiment becomes close to the electric energy consumed during the job processing of the print job.

Thus, since the power measurement unit 50 is mounted in the image forming apparatus 200 in this embodiment, the electric energy consumption according to the operating state can be obtained by the actual measurement. Therefore, this embodiment enables to raise the accuracies in the calculation, measurement, and control of the electric energy consumption of the image forming apparatus 200.

Next, a third embodiment of the present invention will be described with reference to the drawings.

The third embodiment shows an example that a power consumption control server other than the image forming apparatus achieves the functions to calculate, to measure, and to control the electric energy consumption, which are achieved by the image forming apparatus in the first and second embodiments. This configuration enables the power consumption control server to control the information about the electric energy consumption of two or more image forming apparatuses in a unified way. That is, in the third embodiment, the electric power control apparatus corresponds to the server, and the image forming apparatuses are target electronic apparatuses of which electric energy consumption is controlled.

Figure 16:
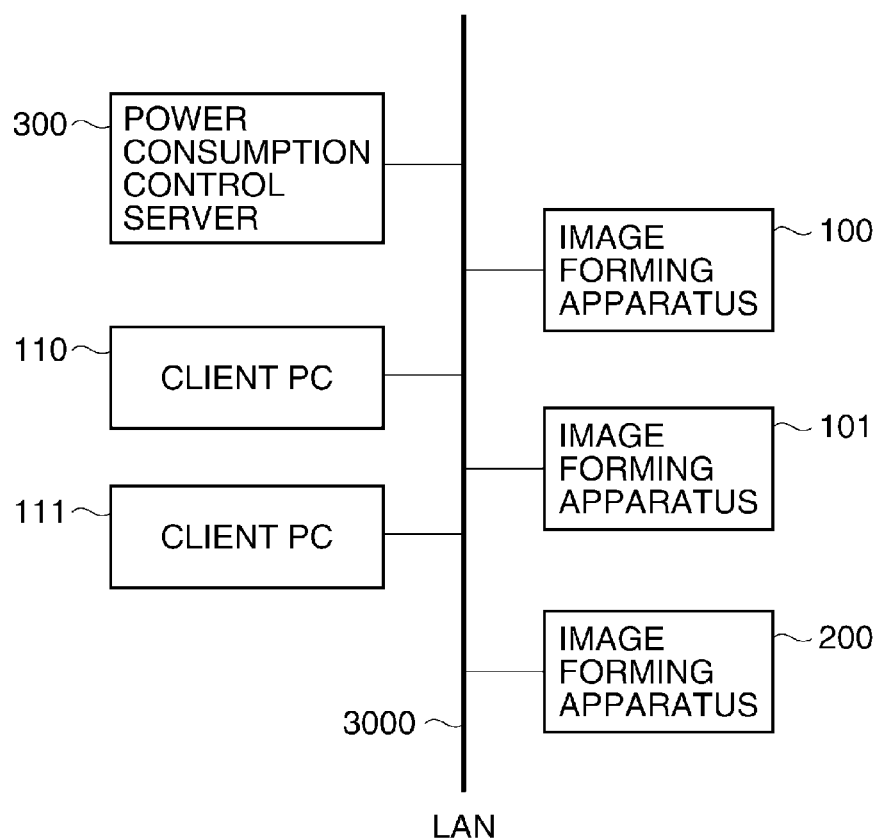
FIG. 16 is a view showing a configuration of a network system that controls information about electric energy consumption of each image forming apparatus according to a third embodiment of the present invention.

FIG. 16 is a view showing a configuration of a network system that controls information about electric energy consumption of each image forming apparatus according to the third embodiment.

The system in FIG. 16 is provided with client PCs 110 and 111, the image forming apparatuses 100, 101, and 200, and the power consumption control server 300. The client PCs 110 and 111, the image forming apparatuses 100, 101, and 200, and the power consumption control server 300 are connected via the LAN 3000, respectively, so that mutual communication is possible.

The configuration of each of the image forming apparatuses 100, 101, and 200 in this embodiment is almost the same as that in the first and second embodiment, but the electric energy consumption control program 1290 is excluded.

The hardware configuration of the power consumption control server 300 is the same as the configuration of the client PC 110 as shown in FIG. 5. In this embodiment, the electric energy consumption control program 1290 is executed by a CPU of the power consumption control server 300.

The electric energy consumption control program 1290 that the power consumption control server 300 executes is the same as that in FIG. 6. The electric energy consumption control program 1290 is stored in the HDD of the power consumption control server 300 as the function that the power consumption control server 300 should achieve. The job history collection module 1294 acquires and holds the job history information table that is controlled in the job history control unit 1212 by communicating with the image forming apparatus 100, 101, and 200 via the interface module 1293.

The power consumption information included in the acquired job history information table is acquired by actual measurement when the image forming apparatus of the communication target has the power measurement unit 50 like the image forming apparatus 200.

On the other hand, when the image forming apparatus of the communication target does not have the power measurement unit 50 like the image forming apparatus 100, the power consumption information is calculated by estimation by the image forming apparatus or the power consumption control server 300.

When collecting the job history information tables from a plurality of image forming apparatuses, it is possible to add the identifiers of the image forming apparatuses as information to the tables. The total electric energy consumption holding module 1292 reads and holds the electric energy consumption of the job and the electric energy consumption between the jobs from the job history information table held in the job history collection module 1294.

The power consumption control server 300 controls the network unit 1307 so as to output the total electric power consumption of each image forming apparatus to the client PC 110 and the other external apparatuses connected to the LAN 3000.

Figure 17:
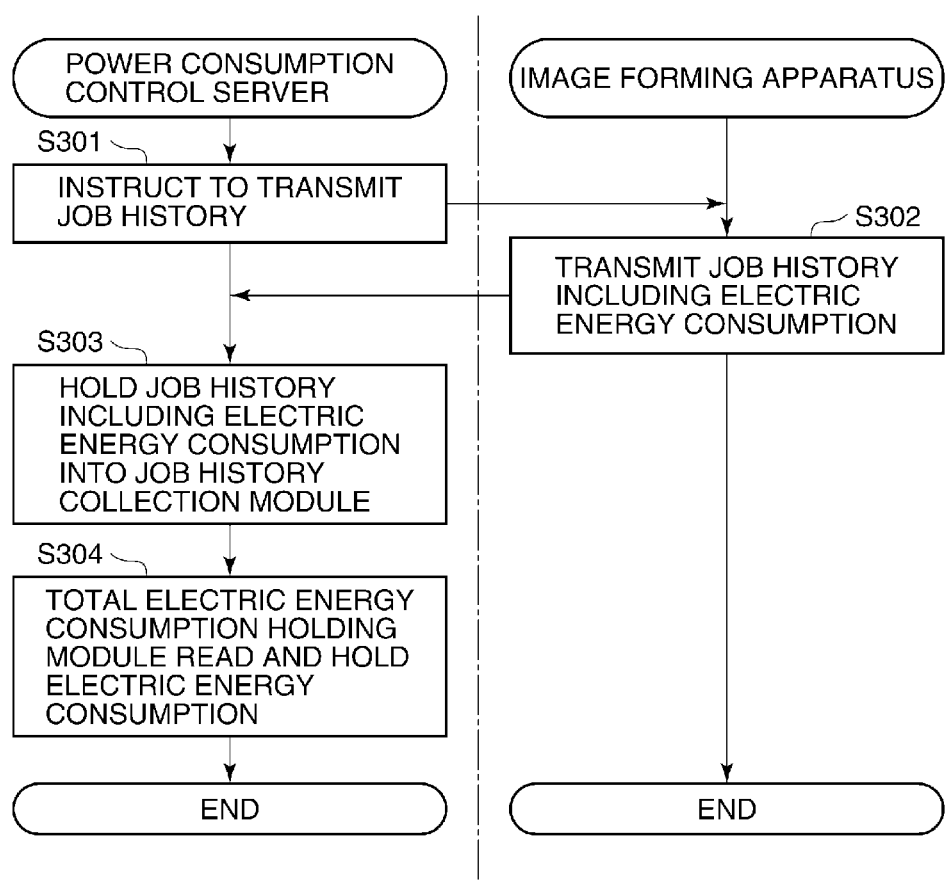
FIG. 17 is a flowchart showing procedures of a job information acquisition process executed by the power consumption control server and the image forming apparatus in FIG. 16.

FIG. 17 is a flowchart showing procedures of a job information acquisition process executed by the power consumption control server 300 and the image forming apparatus.

In FIG. 17, the image forming apparatus 100 is a target of the processing.

The CPU 1301 of the power consumption control server 300 instructs to transmit the job history to the image forming apparatus 100 via the network unit 1307 (step S301).

When receiving the instruction via the network unit 1210, the image forming apparatus 100 transmits the job history information table currently held in the job history control unit 1212 by the CPU 1201 to the power consumption control server 300 via the network unit 1210 (step S302). It should be noted that the acquisition method of the electric energy consumption that exists in the job history information table is the same as that in the first embodiment and the second embodiment. The CPU 1201 may newly hold the job history information table that has transmitted to the job history control unit 1212 as the transmitted job history information table.

When receiving the job history information table via the network unit 1307, the power consumption control server 300 holds the job history information table to the job history collection module 1294 (step S303). Then, the total electric energy consumption holding module 1292 reads and holds the electric energy consumption using the newly collected job history information table (step S304), and this process finishes.

By performing the process described above for each image forming apparatus, the electric energy consumption of each image forming apparatus can be calculated and controlled.

Thus, the power consumption control server 300 can calculate and control the electric energy consumption of the image forming apparatuses in a unified way.

The flowcharts (FIGS. 7, 14, and 17) described above are examples strictly, and an existing step may be deleted and a new step may be added unless the change deviates from the gist of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-264960, filed on Nov. 29, 2010, which is hereby incorporated by reference herein in its entirety.

What is claimed is:

1. An information processing apparatus comprising:
a first execution unit configured to execute a first job;
a second execution unit configured to execute a second job irrespective of a reason for interruption of the first job;
a calculation unit configured to calculate electric energy consumption in a period from a start of execution of the first job by said first execution unit to an end except electric energy consumption in a period from interruption of execution of the first job by said first execution unit to restarting, as electric energy consumption at the time of job execution,
wherein the first execution unit performs a degeneration operation of a function in a case where the second executing unit starts and completes execution of the second job while the first execution unit interrupts execution of the first job due to the reason for interruption of the first job, and
the calculation unit calculates electric energy consumption of the information processing apparatus in a period from interruption of execution of the first job by said first execution unit to restarting, except electric energy consumption in a period from a start of execution of the second job by said second execution unit to an end, as electric energy consumption during the interruption of the first job.

2. The information processing apparatus according to claim 1, wherein said calculation unit calculates electric energy consumption when said first execution unit stands by for execution of the job, as electric energy consumption at the time of the first job standby.

3. The information processing apparatus according to claim 1, further comprising a first displaying unit configured to display the electric energy consumption at the time of the first job execution and the electric energy consumption at the time of the second job execution distinguishably for every time.

4. The information processing apparatus according to claim 1, further comprising a second displaying unit configured to display the electric energy consumption at the time of the first job execution and the electric energy consumption at the time of the second job execution distinguishably for every user.

5. The information processing apparatus according to claim 1, further comprising a third displaying unit configured to display the electric energy consumption at the time of the first job execution and the electric energy consumption at the time of the second job execution distinguishably for every job type.

6. The information processing apparatus according to claim 1, further comprising a job history collection unit configured to acquire history information showing the history of the each operating state of the information processing apparatus,
wherein the calculation unit calculates the electric energy consumption in each operating state of the information processing apparatus shown in the history information using the history information acquired by the jog history collection unit and the electric power consumption that is determined according to the each operating status of the information processing apparatus.

7. An information processing method, the method comprising:
executing a first job;
executing a second job, irrespective of a reason for interruption of the first job; and
calculating electric energy consumption in a period from a start of execution of the job in said executing to an end except electric energy consumption in a period from interruption of execution of the first job in said executing to restarting, as electric energy consumption at the time of job execution,
performing a degeneration operation of a function, in a case where execution of the of the second job is started and completed, while execution of the first job is interrupted due to the reason for interruption of the first job, and
calculating electric energy consumption in a period from interruption of execution of the first job to restarting, except electric energy consumption in a period from a start of execution of the second job to an end, as electric energy consumption during the interruption of the first job.

8. A non-transitory computer-readable storage medium storing a control program causing a computer to execute an information processing method comprising:
executing a first job;
executing a second job, irrespective of a reason for interruption of the first job; and calculating electric energy consumption in a period from a start of execution of the job in said executing to an end except electric energy consumption in a period from interruption of execution of the first job in said executing to restarting, as electric energy consumption at the time of job execution, performing a degeneration operation of a function, in a case where execution of the of the second job is started and completed, while execution of the first job is interrupted due to the reason for interruption of the first job, and calculating electric energy consumption in a period from interruption of execution of the first job to restarting, except electric energy consumption in a period from a start of execution of the second job to an end, as electric energy consumption during the interruption of the first job.

* * * * *